United States Patent [19]
Typaldos et al.

[11] Patent Number: 5,958,024
[45] Date of Patent: Sep. 28, 1999

[54] SYSTEM HAVING A RECEIVE DATA REGISTER FOR STORING AT LEAST NINE DATA BITS OF FRAME AND STATUS BITS INDICATING THE STATUS OF ASYNCHRONOUS SERIAL RECEIVER

[75] Inventors: Melanie D. Typaldos, Buda; Patrick E. Maupin, Austin, both of Tex.

[73] Assignee: Advanced Micro Devices, Inc., Austin, Tex.

[21] Appl. No.: 08/920,930

[22] Filed: Aug. 29, 1997

[51] Int. Cl.⁶ .............................. G06F 13/28; G06F 13/42
[52] U.S. Cl. .................................. 710/26; 710/9; 710/14; 710/30; 709/221; 709/234; 711/156
[58] Field of Search ........................... 324/312; 364/133; 370/438, 535; 375/220; 395/850, 250, 286, 309, 500, 566; 709/221, 234; 711/156; 710/9, 14, 26, 30

[56] References Cited

U.S. PATENT DOCUMENTS

| | | | |
|---|---|---|---|
| 4,631,666 | 12/1986 | Harris et al. | 395/309 |
| 4,698,802 | 10/1987 | Goke et al. | 370/535 |
| 4,713,748 | 12/1987 | Magar et al. | 395/566 |
| 4,785,396 | 11/1988 | Murphy et al. | 395/286 |
| 4,823,305 | 4/1989 | Holdren et al. | 395/850 |
| 4,885,538 | 12/1989 | Hoenniger, III et al. | 324/312 |
| 4,972,432 | 11/1990 | Wilson et al. | 375/220 |
| 5,150,359 | 9/1992 | Wilson et al. | 370/438 |
| 5,166,872 | 11/1992 | Weaver et al. | 364/133 |
| 5,535,373 | 7/1996 | Olnowich | 395/500 |
| 5,548,711 | 8/1996 | Brant et al. | 395/182.03 |
| 5,596,724 | 1/1997 | Mullins et al. | 395/250 |
| 5,812,820 | 9/1998 | Loram | 395/500 |

OTHER PUBLICATIONS

*Am186™ED/EDLV Microcontrollers User's Manual*, Advanced Micro Devices, Inc., 1997, pp. ii through 10–16.
*Am186™ED, High Performance, 80C186–and 80C188–Compatible, 16–Bit Embedded Microcontroller*, Advanced Micro Devices, Inc., Mar. 1997, pp. 1, 2, 13, 47 and 48.
*Am186™ES and Am188™ES User's Manual*, Advanced Micro Devices, Inc., 1997, pp. i through ii, 9–1 through 9–14, and 10–1 through 10–14.
*Am186™ES/ESLV and Am188™ES/ESLV*, Advanced Micro Devices, Inc., Publication 20002, Rev. B, Amendment /0, Feb. 1997, pp. 1 through 12, pp. 25 through 52.

Primary Examiner—Thomas C. Lee
Assistant Examiner—Ilwoo Park
Attorney, Agent, or Firm—Akin, Gump, Strauss, Hauer & Feld, LLP

[57] ABSTRACT

An asynchronous serial port having a control register and at least one data register exchanges data with a serial bus. The asynchronous serial port includes an indicator representing whether the data register contains all of the data bits, or whether some of the data may be stored in the control register. When a nine-bit data source (or any data source having more than eight bits of data) is received, the bits need not be divided among multiple registers, but can all be stored in the receive-data register. This is particularly useful during DMA or when the exchange of data has been suspended, for example by an interrupt, while additional frames may be received by the asynchronous serial port. Because frames are stored in a single register when an extended write bit or an extended read bit is set. Further, the receive data register also stores status bits associated with received data. This is especially useful during DMA operations, when status, including parity, frame, or overrun errors can be associated with a particular data item examining the stored DMA data itself.

24 Claims, 7 Drawing Sheets

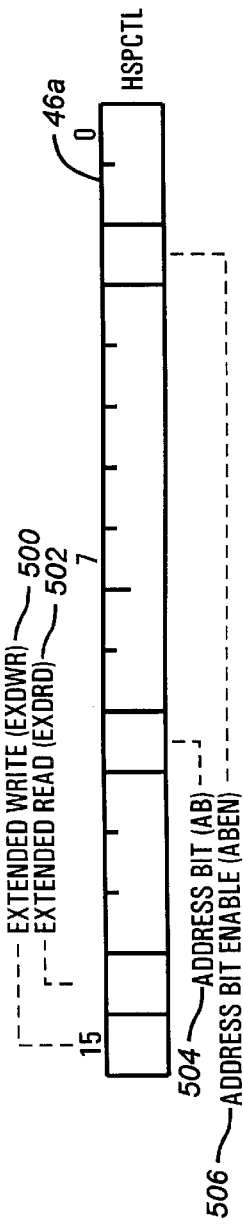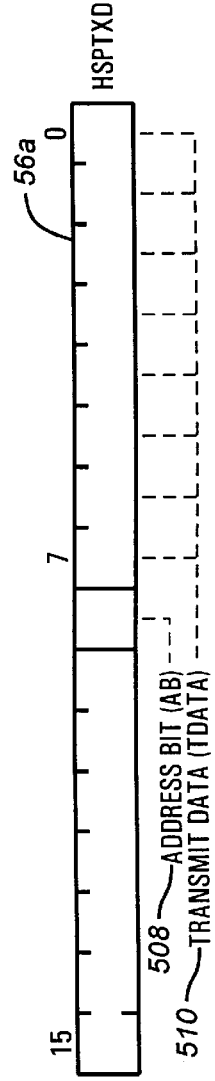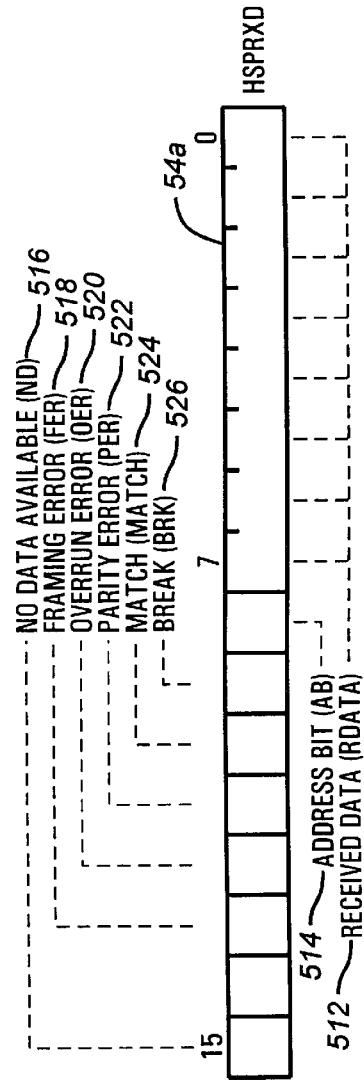

SYSTEM HAVING A RECEIVE DATA REGISTER FOR STORING AT LEAST NINE DATA BITS OF FRAME AND STATUS BITS INDICATING THE STATUS OF ASYNCHRONOUS SERIAL RECEIVER

BACKGROUND OF THE INVENTION

1. Field of the Invention

The apparatus and method according to the invention pertains to microcontrollers, and more specifically, to a microcontroller providing high asynchronous serial port data rates using direct memory access.

2. Description of the Related Art

Although consumers readily recognize the impact of personal computers in our society, they may be less aware of other manifestations of microcomputers within everyday life. Industrial and consumer products often require dedicated intelligence of their own, and to this end, the same technology that powers a personal computer has found its way into everyday industrial and consumer goods, such as cellular phones, televisions, stereo systems, and a wide variety of other products. Similarly, scientific instrumentation, communications systems, and control systems invariably include microcontrollers.

A centerpiece of this technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or AM186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

An asynchronous serial communications port is one such common additional feature in a microcontroller. An asynchronous serial link allows the microcontroller to communicate with other devices or over data lines by sequentially sending and receiving bits of data. The "asynchronous" nature indicates these ports do not provide a separate clock signal to clock the data. Instead, the rate at which data is sent and received must be predetermined or prenegotiated, and independently controlled on both the sending and receiving ends. This data rate is known as the baud rate, which is the inverse of one bit period. The baud rate is generally one of a number of predefined rates, which are standard within the industry. Such rates include 1200, 2400, 4800, 9600, 19.2K, 28.8K, 33.3K, and 54K baud and high data transfer rates.

Due to the prevalence of serial data communication, many microcontrollers include one or more asynchronous serial ports (ASPs) which can transmit and receive data one bit at a time. Such microcontrollers typically employ interrupt signals to notify the microprocessor core that an ASP requires services. An ASP typically issues an interrupt request signal when a data unit has been received by the ASP and needs to be transferred from the ASP to an external memory unit, when the ASP is finished transmitting a data unit and the next data unit to be transmitted must be transferred from the external memory unit to the ASP, or when an error occurs.

An ASP can be configured for a variety data formats, although historically seven or eight data bits are typical values. A number of nine-bit serial protocols, however, have been developed using microcontrollers, including a nine-bit asynchronous serial protocol in conjunction with direct memory access. Such protocols are described in U.S. patent application Ser. No. 08/807,103, now U.S. Pat. No. 5,896,549, entitled "System for selecting between internal and external DMA request where ASP generates internal request is determined by at least one bit position within configuration register", filed Feb. 4, 1997, by John P. Hansen, Louis R. Stott, and Melanie D. Typaldos, and U.S. patent application Serial No. 08/775,262, entitled "A Microcontroller Having Hardware Features Supporting 9-Bit Serial Protocols During DMA Data Transfers to and from one or more Asynchronous Serial Ports," filed Feb. 4, 1997, by John P. Hansen, Ronald W. Stents, and Melanie D. Typaldos, both of which are commonly assigned and hereby incorporated by reference. These protocols are also described in the Am186ES Users Manual and Am186ED Users Manual, both by Advanced Micro Devices, Inc. of Sunnyvale, Calif. As described in those applications, and as discussed below, a separate control bit is set or reset to act as the ninth data bit during transmission and reception of data. To support DMA using such 9-bit protocols, when that particular bit is received as a certain value, an interrupt is caused to indicate that the ninth data bit has in fact been set.

Expanded functionality, however, in providing asynchronous communication using direct memory access and in providing data bits greater than a standard eight data bits is always desirable.

SUMMARY OF THE INVENTION

According to the invention, standard serial receive and transmit registers are modified to hold extended data. Rather than providing eight data bits in the receive and transmit data registers and then providing the ninth data bit in a status or control register, when the extended mode according to the invention is enabled, all nine transmit or receive data bits are placed into a 16-bit transmit or receive register. Then, word wide DMA writes and reads can properly send and receive all nine data bits simultaneously, rather than requiring interrupt when the ninth data bit is set.

Further, the extended receive data register also includes certain helpful status bits associated with the data actually received within the high order byte of the data. In addition to the ninth data bit, match detect, overrun, break, frame error, and parity error values are all held in the high order byte of the 16-bit receive register. Thus, DMA reads not only read data from the asynchronous serial port, but read the status associated with that data. This is helpful in providing a correspondence between any particular data errors and the data item which caused the error. This prevents the need for an interrupt on an error condition, which could ultimately result in an overrun condition if the interrupt service routine could not service the serial port quickly enough.

Additionally, as the DMA data is received and stored, the asynchronous status register accumulates any errors that might occur. The status register error bits are only reset when read, so an error on any of the DMA transfers will set the corresponding status bit for the remainder of the DMA Then, software can first check the status register. If it has no errors set, the DMA occurred without error. Only if an error occurred is it necessary to examine the memory where the status bits were stored along with the received data.

When used with DMA, the nine bit single data reading according to the invention also prevents the need to provide separate interrupt code to "fix" the data in memory when the ninth bit is set. It also eliminates the need to reconfigure or restart the DMA that may have been terminated by the interrupt. Instead, the DMA itself handles the transfers of the ninth bit.

The techniques according to the invention is further useful even when DMA is not used to access the serial port. If the execution unit polls the serial port, providing all nine data bits in a single read or providing the status bits with the data bits both reduce the number of serial port reads necessary to obtain data and status. This is especially beneficial at high data rates, where serial port reads can absorb a significant portion of the execution units bandwidth.

All of these features are especially helpful in high speed asynchronous communications.

BRIEF DESCRIPTION OF THE DRAWINGS

A better understanding of the present invention can be obtained when the following detailed description of the preferred embodiment is considered in conjunction with the following drawings, in which:

FIG. 8 is a high speed serial port control register including additional features according to the invention;

FIGS. 9 and 10 are high speed serial port transmit and receive data registers extended according to the invention;

DETAILED DESCRIPTION OF THE PREFERRED EMBODIMENT

Figure 1:
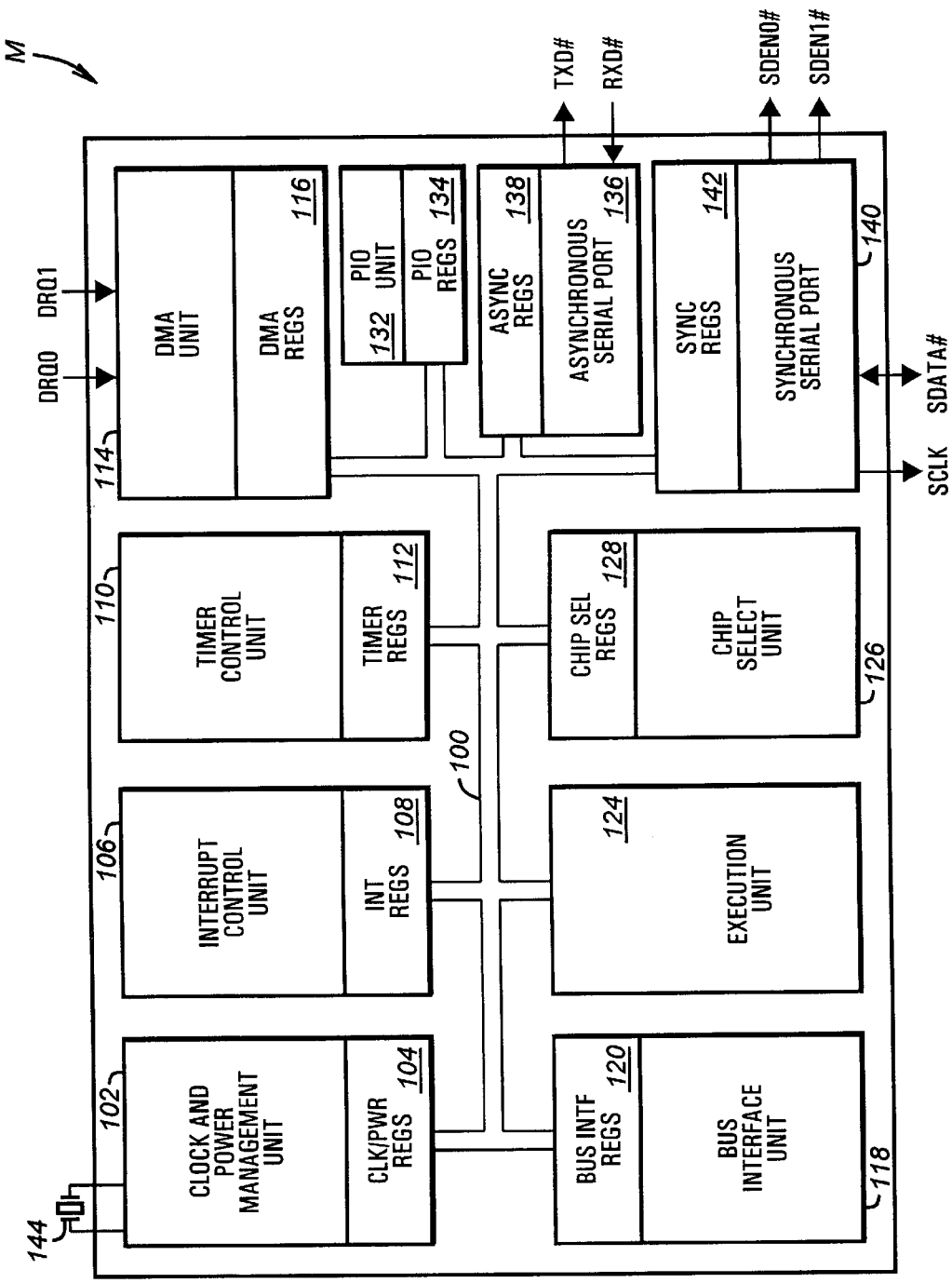
FIG. 1 is a block diagram of a typical microcontroller in which the techniques according to the invention can be implemented.

Turning to FIG. 1, shown is a block diagram of a typical microcontroller M implemented according to the invention. Such a microcontroller is preferably implemented on a single monolithic integrated circuit. The microcontroller M preferably includes an internal bus 100 coupling a variety of functional units and registers used to control and monitor those units. These include a clock and power management unit 102 with corresponding clock/power registers 104, an interrupt control unit 106 with corresponding interrupt registers 108, a timer control unit 110 with corresponding timer registers 112, a direct memory access (DMA) unit 114 with corresponding DMA registers 116, a bus interface unit 118 with corresponding bus interface registers 120, an execution unit 124 which is essentially a microprocessor core, a chip select unit 126 with corresponding chip select registers 128, a programmable input/output (PIO) unit 132 with corresponding PIO registers 134, an asynchronous serial port 136 with corresponding asynchronous register 138, and a synchronous serial port 140 with corresponding synchronous registers 142. The clock and power management unit 102 includes external pads connected to a crystal 144, which provides the timing not only for the execution unit 124, but also for generating the serial clock in the asynchronous serial port 136.

The block diagram of the microcontroller M is typical of microcontrollers, and could be for example, the Am186EM microcontroller by Advanced Micro Devices, Inc., of Sunnyvale, Calif. The techniques and circuitry according to the invention, however, could be applied to a wide variety of microcontrollers. Further, the term "microcontroller" has differing definitions in industry. Some companies refer to a processor core with additional features (such as I/O) as a "microprocessor" if it has no onboard memory, and digital signal processors (DSPs) are now used for both special and general purpose controller functions. So as here used, the term "microcontroller" covers all of the products, and generally means an execution unit with added functionality all implemented on a single monolithic integrated circuit.

In many cases, a microcontroller containing an asynchronous serial port is configured to begin receiving asynchronous data via the asynchronous serial port 136. It will be recognized that the execution unit 124 of the microcontroller M executes instructions of software programs. The microcontroller M can be configured to cause an interrupt from the asynchronous serial port 136 when an asynchronous device sends data to the microcontroller M. That interrupt is then interpreted by the interrupt control unit 106 on the internal bus 100. Upon receiving an interrupt, the execution unit 124 stops program execution, saves the contents of certain critical registers (i.e., saves its internal state), and begins executing instructions of an appropriate interrupt service routine (such as an interrupt handler) associated with the asynchronous serial port 136. When execution of the interrupt service routine is completed, the execution unit 124 restores the saved contents of the critical registers (i.e., restores the internal state) and resumes execution of the interrupted program at the point where the interruption occurred.

ASYNCHRONOUS COMMUNICATION PROTOCOL

Asynchronous serial communication is a standard means of transmitting data over distances greater than about 25 feet. In serial data communication, each unit of data (e.g., an 8-bit byte representing the character) is transmitted one bit at a time over a transmission medium (e.g., a pair of wires, a coaxial cable, etc.). Asynchronous communication can begin with a communication "handshake" during which the sender and the receiver of communication negotiate a set of rules for communicating data. The set of rules can include the speed at which information will be transferred, the number of bits per frame, and the format of any overhead information, as well as other matters. A "frame" of data typically includes a sequence of consecutive data bits, possibly together with one or more overhead bits. Overhead bits include any start bits and stop bits, and define any parity bits that may be used.

Figure 1A:
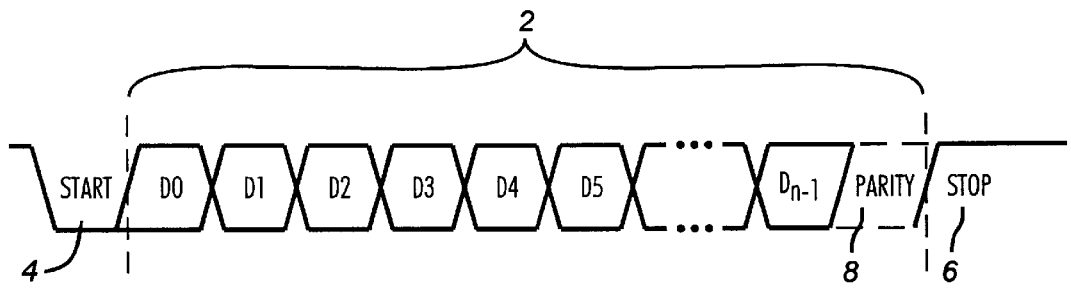
FIG. 1A is a diagram of a data frame used in asynchronous serial communications.

Referring now to FIG. 1A, a diagram of a data "frame" used in asynchronous serial communication is shown. During each frame, data is digitally transmitted by sending a start bit, a number of data bits and possibly one or more parity bits, and a stop bit from the sender to the receiver. Thereafter, additional frames are also transmitted. The data frame includes multiple data bits 2 transmitted between a start bit 4 and one or more stop bits 6. Data bits 2 include n bits of data unit, $D_0$ through $D_{n-1}$, where n is typically 7 or 8, and an optional parity bit 8 which may be added to facilitate error detection. The start bit (invariably 0) is typically transmitted before the first character bit, and one or more stop bits (invariably 1) are transmitted after the last character bit. The start bit 4 signals the beginning of the frame, and the one or more stop bits signal the end of the frame. The start bit 4 and the stop bits 6 are used to synchronize a transmitter and a receiver during asynchronous serial communication. The transmitter and receiver must both use the same set of rules designating how many bits are transmitted per second (i.e., the baud rate), how many bits are included in a data unit, whether a parity bit is included, and how any stop bits are added after the data bits.

Figure 1B:
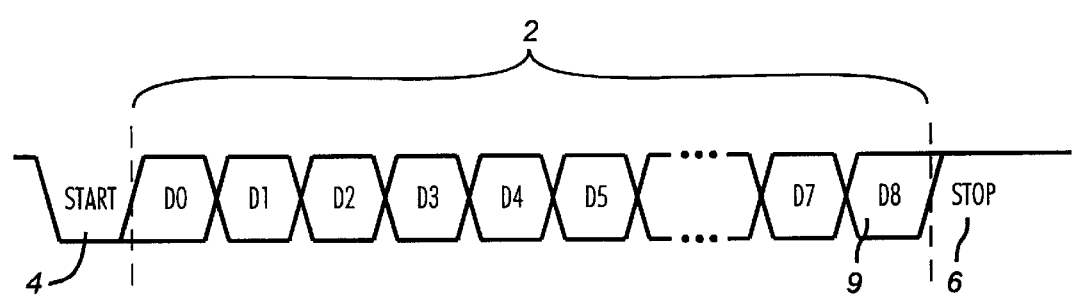

Microcontrollers have been implemented that can operate in 7, 8, or 9-bit serial protocols to transfer data using asynchronous serial communication. In some systems, a header byte or header frame has included the number of data bits transmitted per succeeding data frame, allowing use of the ninth bit of each succeeding data frame to be used for parity (i.e., simple error detection techniques). In other systems, the ninth bit of data has been used to indicate the final frame in a series of frames, such that the ninth bit is 0 in each of the frames except for the last frame, while in the last frame the ninth bit is set to 1. Nine-bit serial protocols are commonly used to manage communications between multiple microcontrollers coupled to a common transmission medium. In such a case, each data packet typically includes one or more "header" frames at the beginning of the data packet. Each data packet may also include one or more "trailer" frames at the end of the data packet. One of the header frames typically includes a unique device identification (I.D.) number assigned to the intended receiver. The trailer frames may include, for example, the last data units of the data packet or a cyclic redundancy check (CRC) value for error detection. In FIG. 1B, a ninth data bit 9 is set to 1 in the header and trailer frames and is set to 0 in other data packet frames.

When operating under a 9-bit protocol, the lowest-order eight bits (bits 7:0) are transmitted in a data byte, and the ninth bit (bit 8) is transmitted in place of the parity bit. Such a protocol is illustrated in FIG. 1B, where the ninth bit 9 follows the initial eight data bits.

ASYNCHRONOUS SERIAL PORT REGISTERS

Figure 3:
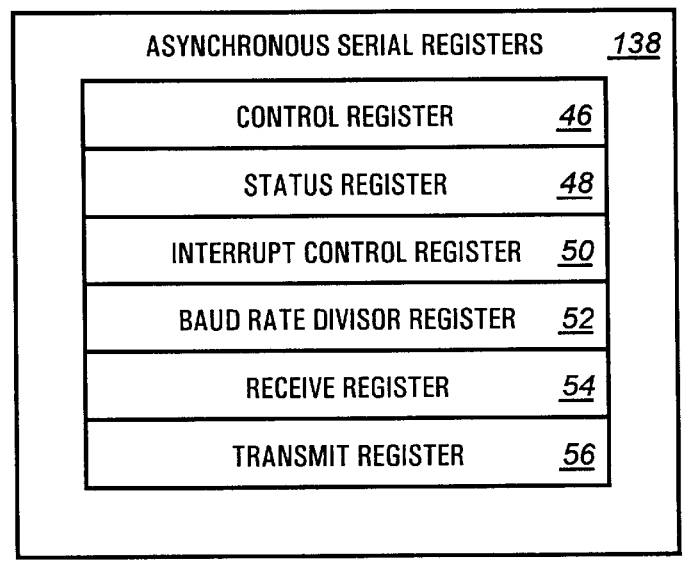
FIG. 3 is a block diagram illustrating typical asynchronous serial registers in the microcontroller of FIG. 1.

As shown in FIG. 1, and as further shown in FIG. 3, the typical microcontroller M includes asynchronous serial port registers 138. The asynchronous serial port registers 138 include a control register 46, a status register 48, a baud rate divisor register 52, a receive register 54 also referred to as a receive data register, and a transmit register 56 also referred to as a transmit data register. In some microcontrollers, an interrupt control register 50 is also included. In multiple ASP microcontrollers, each of these registers exist for each of the serial ports.

The ASP 136 is typically bidirectional, i.e. is capable of both sending data and receiving data. The status register 48 operates in conjunction with the receive register 54 when the port 136 receives data, and operates in conjunction with the transmit register 56 when the port 136 sends data.

SERIAL PORT CONTROL REGISTER

Figure 4:
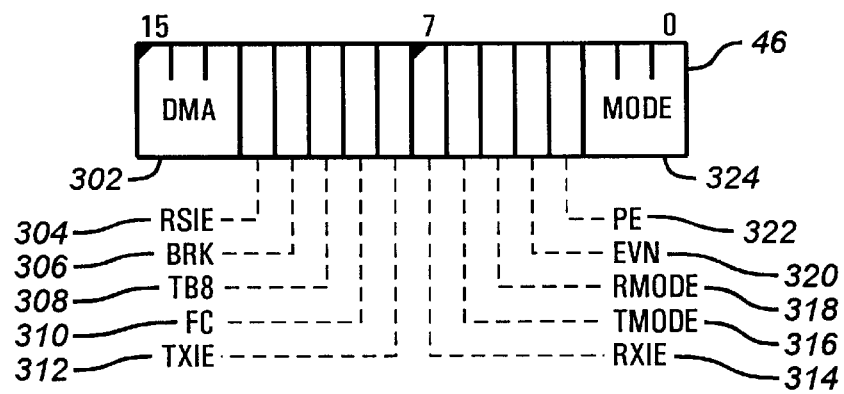
FIG. 4 is a block diagram illustrating bits within a serial port control register of the serial port registers of FIG. 3.

Referring now to FIG. 4, a serial port control register 46 is shown. The serial port control register 46 contains 16 bits, numbered according the radix notation in which the bits are [15:0]. Bits [15:13] 302 are the DMA control bits for the particular serial port. Bit [12] 304 is an RSIE bit, the Receive Status Interrupt Enable bit, which enables the serial port to generate an interrupt request when an exception occurs during data reception. Bit [11] 306 is a BRK bit, for sending abreak signal. Bit [10] 308 is the "transmit bit 8 (TB8)" indicator, storing the ninth data bit in modes two and three. As explained below, mode 2 allows 9-bit communication, and mode 3 allows either 8- or 9-bit communication. Bit [9] 310 is a Flow Control Enable bit. Bit [8] 312, the transmit ready interrupt enable (TXIE) bit, commands an interrupt request whenever a transmit holding register is empty and the bit is set. When the bit is reset, the serial port does not generate transmit interrupt requests at all.

Bit [7] 314 is the Receive Data Ready Interrupt Enable (RXIE) bit, which causes the asynchronous serial port 136 to generate an interrupt request whenever the receive register contains valid data and the RXIE bit is set. Bit [6] 316 indicates whether the transmit section of the serial port is enabled and able to generate interrupt requests. Bit [5] 318 indicates whether the receive section of the serial port is enabled and able to generate interrupt requests. Bit [4] 320, the even parity (EVN) bit, commands even parity checking when set, and odd parity checking when reset. Bit [3] 322, the parity enable (PE) bit, enables parity checking when set.

Bits [2:0] 324 indicate the mode of operation. Mode 1 allows either 7 or 8 data bits per frame, with either 1 or 0 parity bits and one stop bit. Mode 2 allows 9 data bits per frame and one stop bit. Parity is disabled, since the parity bit is used for data. Mode 3 allows either 8 or 9 data bits per frame and one stop bit. Either 1 or 0 parity bits are used. As stated, in modes 2 and 3, nine data bits are supported. In mode 2, the serial port receiver will not complete a data reception unless the ninth data bit is set (high). Any character received with the ninth data bit reset (low) is ignored. The transmit portion of the port behaves identically with the mode 3 operation. Mode 2 can be used in conjunction with mode 3 to allow for multidrop communications over a common serial link. The serial port is configured as mode 2 initially. Each time data is received with the ninth bit set, the data is compared by software against a unique ID for this receiver. If the received data does not match the port ID, the port is left in mode 2. If the received data matches the port ID, software reconfigures the serial port to mode 3, allowing it to receive 9-bit data with the ninth bit reset. Mode 4 allows only 7 data bits and 1 stop bit, and parity is disabled. Although modes 0, 5, 6, and 7 are defined, these modes are reserved.

In a serial multidrop configuration, multiple serial ports are attached to the same serial line. The master serial port is configured in mode 3 while the slave serial ports are configured in mode 2. The master polls the other devices by sending out status request packets. Each of these status request packets begins with an address byte (i.e., ninth data bit is set). The slave ports report a receive character for the address byte since the ninth bit is set. Each port then attempts to match the address against its own address. If the addresses do not match, the port remains in mode 2 and ignores the remainder of the message. If the addresses match, software reconfigures the port into mode 3. The two mode 3 ports are able to exchange data freely.

Only ports which are actively exchanging data (i.e., ports in mode 3) have hardware handshaking enabled. Thus, multiple devices may not be driving the hardware handshaking lines. Hardware handshaking is not supported for the mode 2 configuration and is not enabled. Nor is hardware handshaking enabled when more than two devices may be configured as mode 3 at any one time.

Mode 3 supports 8 data bits when parity is enabled and 9 data bits when parity is disabled. Historically, when not using parity, the ninth bit (bit 8) for transmission is set by writing a 1 to the TB8 field in the serial port control register. The ninth data bit for the receive is then read in the RB8 field of the serial port status register. In multidrop communications, parity is disabled, and the software interprets receive characters as data as long as the ninth data bit is reset (low). When a character is received with the ninth bit set, software compares the lower eight bits against the port ID. If the port ID matches the receive data, the port remains in mode 3. Otherwise, the port is reconfigured as mode 2.

SERIAL PORT STATUS REGISTER

Figure 5:
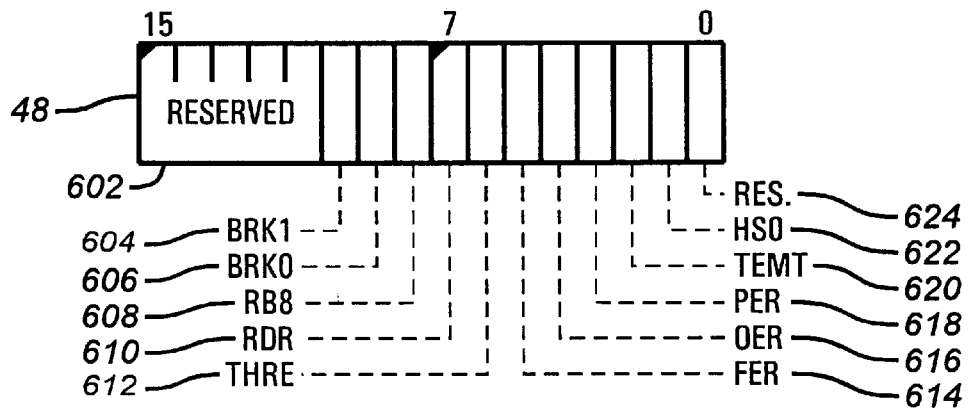
FIG. 5 is a block diagram illustrating bits of a serial port status register of the serial port registers of FIG. 3.

Referring to FIG. 5, a serial port status register 48 is shown. The serial port status register 48 is a 16-bit memory-mapped register. Bits [15:11] 602 are reserved. Bit [10] 604 indicates whether a long break is detected on the asynchronous serial interface. Bit [9] 606 indicates whether a short break is detected on the asynchronous serial interface. Bit [8] 608 contains the ninth data bit, when 9 data bits are transmitted. As discussed in reference to the serial port control register 46, 9 data bits are transmitted when the asynchronous serial port 136 is in mode 2 or mode 3. Bit [8] 608 is reset by software.

Bit [7] 610 is a read-only Receive Data Ready (RDR) bit indicating whether the Receive Data register contains valid data. Bit [6] 612 is a read-only Transmit Holding Register Empty (THRE) bit, indicating whether the transmit holding register is ready to accept data for transmission Bit [5] 614 indicates whether the serial port has detected a framing error, which occurs when the serial port receiver attempts to read a stop bit as data. Bit [4] 616 indicates whether the serial port has detected an overrun error, which occurs when the serial port loses data by overwriting valid but unread data in the receive register. Bit [3] 618 indicates whether a parity error has been detected (in mode 1 or 3). Bit [3] 618 is reset by software. Bit [2] 620 is the read-only Transmitter Empty (TEMT) bit, which indicates whether the transmitter has no data to transmit, and that it is safe to disable the transmit section. Bit [1] 622 is an inverted version of an external signal, and Bit [0] 624 is reserved.

SERIAL PORT TRANSMIT AND RECEIVE REGISTERS

Figure 6:
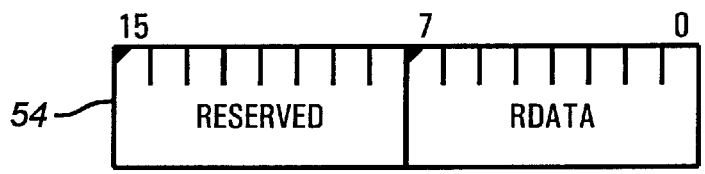
FIGS. 6 and 7 are typical receive and transmit registers historically used as part of the asynchronous serial registers of FIG. 3.
Figure 7:
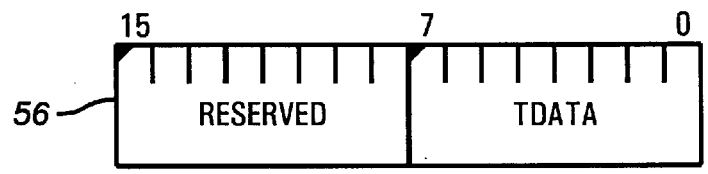

Referring now to FIGS. 6 and 7, the asynchronous serial port 136 also contains the receive register 54 and the transmit register 56. Each of these registers is capable of storing data in the lower-order byte (bits [7:0]) of the respective register, while the upper-order byte (bits [15:8]) has historically been reserved. The microcontroller M is typically able to exchange data in the receive register 54 and the transmit register 56 with various memory units, according to the software running in the execution unit 124.

When data is received by the asynchronous serial port 136, the data is initially stored in the receive register 54. The microcontroller M is also typically able to transmit data in the transmit register 56. Whether the data in the receive register 54 and the transmit register 56 are valid is determined by examining the status register 48. Bit [7] 610 of the status register 48 (see FIG. 6) is the read-only Receive Data Ready (RDR) bit indicating whether the receive data register 54 contains valid data. Bit [6] 612 of the status register 48 is the read-only Transmit Holding Register Empty (THRE) bit, indicating whether the transmit holding register 56 is ready to accept data for transmission.

DMA AND EXTERNAL DEVICES

As shown in FIG. 1, a typical microcontroller includes a DMA Unit 114. Direct memory access (DMA) is a well-known technique which allows data transfers without requiring continuous action by the execution unit 124. Many microcontrollers include a DMA unit which controls DMA data transfer operations. The execution unit 124 simply initializes control registers within the DMA unit 114 with transfer control information. The transfer control information typically includes the first address at the source of the block of the data to be transferred (i.e., the source address), the first address of the destination of the block of data to be transferred (i.e., the destination address), and the number of bytes of words to be transferred (i.e., the byte/word count).

When a device needs to transfer data, the device generates a DMA request signal. The DMA unit responds to the DMA request signal by gaining control of the common bus interconnecting the involved devices and initiating the data transfer operation. The DMA unit generates address and control signals needed to read a byte or word of data from the source address and to write the data to the destination address. After each read/write operation, the source and destination addresses and the byte/word count may be incremented or decremented. (The source/destination address pointing to the serial port, however, is not incremented or decremented, since the serial port is accessed through a fixed address.) This process is continued until the data transfer operation is complete. When the data transfer operation is complete, the DMA unit 114 relinquishes control of the common bus.

Figure 2:
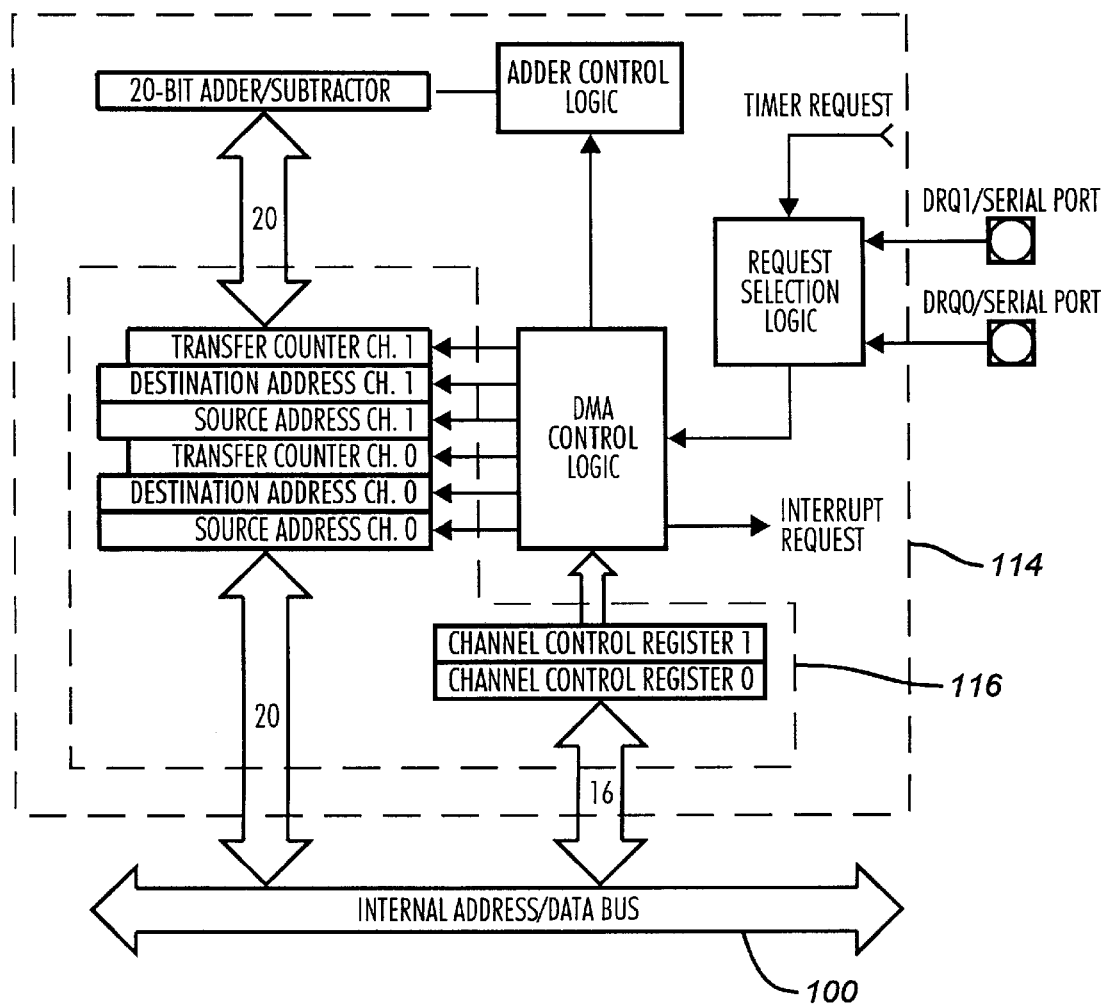
FIG. 2 is a DMA unit block diagram illustrating a DMA unit with two DMA channels in the microcontroller of FIG. 1.

Referring now to FIG. 2, a DMA unit 114 block diagram showing two high-speed DMA channels. Data transfer can occur between memory and I/O spaces (e.g., memory to I/O) or within the same space (e.g., memory to memory or I/O to I/O). Each of the DMA channels can be directly connected to the asynchronous serial ports. The DMA unit 114 can be programmed to perform transfers between the data source in memory or I/O space in the serial port transmit or receive register, thus permitting DMA to serial port transfers. Either bytes or words can be transferred to or from even or odd addresses.

Each channel has six registers in a peripheral control block that defines specific channel operations. The DMA registers 116 consist of a 20-bit source address (two registers), a 20-bit destination address (two registers), a 16-bit transfer count register, and a 16-bit control register.

The DMA transfer count register (DTC) specifies the number of DMA transfers to be performed. The DMA control registers define the channel operation. The DMA control registers specify, for example, the mode of synchronization, whether bytes or words are transferred, whether an interrupt is generated after the last transfer, whether DMA activity ceases after a programmed number of DMA cycles, relative priority of the DMA channel, whether the source address is incremented, decremented, or maintained constant after each transfer, and whether the source addresses memory or I/O space.

The DMA channels can be directly connected to the asynchronous serial ports.

RECOVERY FROM INTERRUPTS

Received asynchronous serial data has historically been divided between the control register 46 and either the receive register 54 or the transmit register 56. This can give rise to synchronization issues, since the microcontroller M may receive DMA requests at about the same time as interrupts are generated.

When an interrupt is being serviced, the control register 46 is substantially held fixed until the interrupt service routine has completed. This is because the interrupt service routine requires access to the control register 46 to determine what caused the interrupt, and how the interrupt is to be handled. However, if additional data is received by the ASP 136, the additional data is placed in the receive register 54 to be handled when the execution unit 124 completes the interrupt cycle and can begin the DMA cycle. When the microcontroller M can begin the DMA cycle, data is transferred from the source address to the destination address via the ASP 136, according to the DMA cycle. Data is received by the ASP 136, placed in the receive register 54, transferred to the transmit register 56 by the execution unit 124, and then transmitted via the ASP 136.

This approach works adequately for data frames having eight bits, i.e. the available size of the transmit register 56 or the receive register 54. However, when a 9-bit protocol is used, most of the received data is indeed placed in the receive register 54 but the ninth bit is not available in the receive register 54 or the transmit register 56, and so cannot be handled by DMA Instead, if data is being received and transferred by DMA, if a "high" ninth bit is received, and interrupt occurs, suspending the DMA. The interrupt service routine must then determine the cause of the interrupt (a high ninth bit), determine which data byte that ninth bit applies to, correct that bit in the DMA destination memory, and reconfigure and restart the DMA. This is inconvenient for the programmer. Further, however, if the interrupt is not serviced and DMA resumed quickly enough, incoming data can overrun the receive register 54. This is exacerbated by high data rates.

EXTENDED TRANSMIT AND RECEIVE REGISTERS ACCORDING TO THE INVENTION

Turning to FIGS. 8–10, illustrated are extensions to certain of the asynchronous serial registers 138 of FIG. 3. According to the invention, the control register 46 is extended to yield an extended high speed port control register 46A. To compare, the high speed serial port control register 46A includes standard serial port control bits as illustrated in FIG. 4 in conjunction with the register 46, but this extended register 46A further includes four bits that are of particular interest. Bits 15 and 14 are an extended write bit (EXDWR) 500 and an extended read bit (EXDRD) 502.

When these bits are false, the ASP 136 acts as described in the previously incorporated application entitled "A Microcontroller Having Hardware Features Supporting 9-Bit Serial Protocols During DMA Data Transfers to and from one or more Asynchronous Serial Ports." When the extended write bit 500 is true, however, the transmit register 56 is modified to instead transmit nine data bits, and when the extended read bit 502 is true, the receive register 54 is modified to both receive nine data bits and to include status in its high order byte. This is discussed in conjunction with FIGS. 9 and 10. Bit 10 and 2 of the extended control register 46A are an address bit (AB) 504 and an address bit enable bit (ABEN) 506. When not in extended mode as specified by the extended write bit 500, setting or resetting the address bit (AB) 504 causes the ninth data bit, when transmitted by the ASP 136, to be true or false. When the extended write bit 500 is set, however, that address bit is instead obtained from the transmit register, discussed below in conjunction with FIG. 9. Similarly, the address bit enable bit (ABEN) 506 enables 9-bit transfer mode. When this bit is true and the extended write bit (EXDWR) 500 is true, the ninth bit, again, is obtained from extended transmit register discussed in conjunction with FIG. 9.

Turning to FIG. 9, shown is a high speed serial port transmit data register 56A. This is similar to the transmit data register 56, but bit 8 is instead designated as an address bit (AB) 508, which is used as the ninth data bit when the extended write bit (EXDWR) 500 of FIG. 8 is set and the address bit enable bit (ABEN) 506 of FIG. 8 is set. In that case, the nine bits, including transmit data bits (TDATA) 510 and the address bit (AB) 508, are together transmitted as the nine bit data item.

Turning to FIG. 10, shown is a high speed serial port receive data register 54A. Again, this is similar to the receive register 54 of FIG. 3 in that the lower eight bits contain receive data (RDATA) 512. Additionally, however, bit 8 is provided as an address bit (AB) 514, which holds the ninth data when 9-bit mode is enabled and the extended read bit (EXDRD) 502 of FIG. 8 is true. Further, however, bits 15 and 13-9 provide status associated with the particular data that the register 54A holds as receive data 512. Specifically, the high speed serial port receive data register 54A also provides a no data available bit (ND) 516, a framing error bit (FER) 518, an overrun error bit (OER) 520, a parity error bit (PER) 522, a match bit (MATCH) 524, and a break bit (BRK) 526. All of these bits effectively reflect the data illustrated in conjunction with the status register 48 of FIG. 5, but these bits are now instead associated with a particular data item.

This is especially beneficial during DMA transfers. This is illustrated in the block diagram of FIG. 11, which shows data flow in conjunction with DMA reads from the ASP 136. Assume data 700 is being received which, when received, will cause a framing error at a particular point 702. Assume also, however, that rather than the execution unit 124 polling the ASP 136, the execution unit 124 has programmed the DMA unit 114 to carry out a DMA read operation from the ASP 136 storing the data in a series of memory locations 704. Therefore, the DMA unit 114 sequentially performs DMA transfers from the high speed serial port receive data register 54A, and stores the received data as 16-bit data items 706, 708, 710, 712, 714, 716, 718, and 720. As is illustrated, according to the invention, the DMA unit 114 not only receives and stores 9-bit data items 722, but further stores the status associated with each of the data items 706–720. Specifically, a frame error bit 724 is illustrated as being stored for each data item, and referring to the data item 714, it is seen that a frame error bit 726 is set as true. This reflects the frame error 702 that occurred within the initial data reception 700.

In storing that frame error 726 associated with the data item 714, the DMA unit 114 did not have to pause, but could instead continue to receive the rest of the data 700. Note that an interrupt is not precluded—the ASP 136 could be programmed to cause an interrupt to the execution unit 124 on particular errors. But if that is not necessary, associated error conditions could simply be stored in the data 704. Further, no execution unit 124 intervention is necessary for the receipt of 9-bit data items 722.

Thus, according to the invention, both 9-bit data items and their associated status can be read from the asynchronous serial port 136 using the DMA unit 114, and similarly, 9-bit data items can be written using the DMA unit 114 to perform extended writes to the asynchronous serial port 136.

Figure 11:
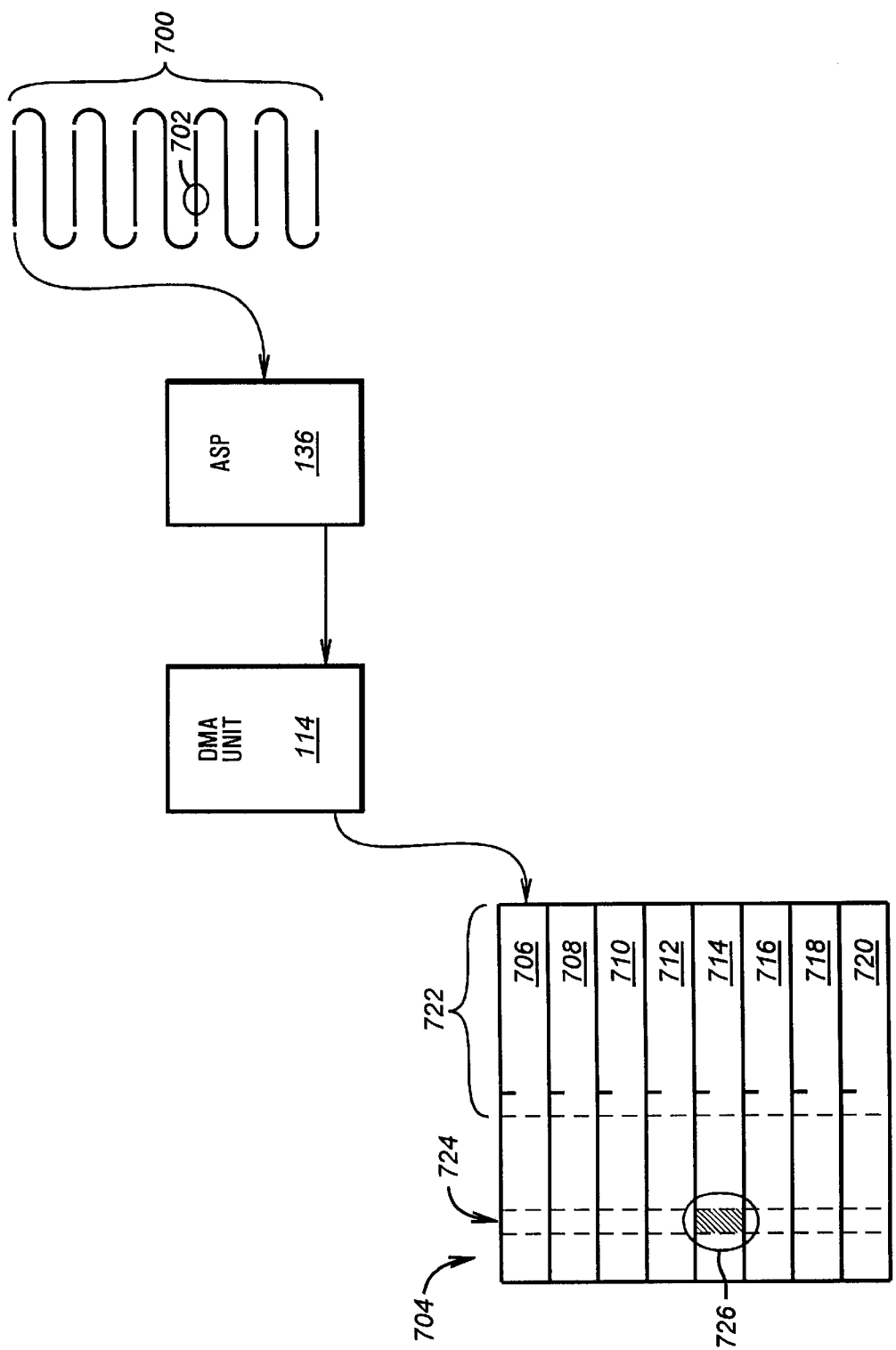
FIG. 11 is a diagram illustrating the use of the extended receive data register according to the invention in conjunction with direct memory access.

Referring to FIG. 11, an additional benefit should be noted. After the DMA unit 114 has transferred the data 706–720, a single read of the status register 48 reveals whether any of the transfers have caused an error. Error bits in the status register 48 are only reset by reading that status register 48, so the status register 48 effectively "ors" the error bits associated with all of the data 706–720 transferred in the DMA. So after a DMA, software need not examine all of the memory holding data 706–720, but first check for errors in the status register 48. If no error flags are set, the software knows the DMA occurred error free. If one or more error flags is set, then the software checks the stored status bits corresponding to the received data 706-720 to determine the associated data.

RECOVERY FROM AN INTERRUPT

As in the prior microcontrollers, it may occur that an interrupt is generated during data transfer. It may also happen that the data transfer is in a mode of operation in which more than 8 bits of data are included in each frame. For example, the asynchronous serial port 136 may be operating in a nine-bit mode. When the extended read bit 502 and the extended write bit 504 are deasserted, the ninth data bit is handled using interrupts as previously described. However, if either the extended read bit 502 is asserted on a receive mode operation or the extended write bit 504 is asserted on a transmit mode operation, even if interrupts occur, the ninth data bit is easily associated with its other eight data bits.

One such transfer is a DMA access. DMA requests are handled by the execution unit 124 in communication with the DMA unit 114. The DMA request handler may cause the asynchronous serial port 136 to receive data over the serial bus, store the data in the receive register 54 (and perhaps the ninth bit in the control register 46) among the asynchronous serial port registers 138, the ninth bit is set, or if another interrupting error condition occurs, however, the DMA will be suspended, and an overrun could occur. Further, it may be unclear which DMA data is invalid, because no status bits are stored, nor is the ninth data bit stored. This is alleviated by the extended transmit and receive registers 54A and 56A according to the invention.

However, when the extended write (on transmit) or extended read (on receive) is set or asserted, the 16-bit dataword contains its own status. Status bits [13:9] contain the status for the frame, while bits [8:0] contain the 9 bits of data. If an error is detected, causing an interrupt condition, the frame that caused the error can be identified by reference to the data stream. The status register 48 provides an interrupting error condition, but the interrupt service routine can also determine which cause (overrun, break, framing error, or parity error) merely by reference to the data word.

On a 9-bit extended write, a complete data bit sequence of a frame can be constructed in the transmit register 56, without having to store 8 bits in the transmit register 56 and one bit in the control register 46 or the status register 48. This also provides full support for 9-bit DMA data transmission.

NON-DMA READS AND WRITES

The extended reads or extended writes according to the invention are beneficial even if not used with DMA By providing all of the data and the necessary status bits in a single register, a single read is all that is necessary to both determine whether data has been received and what that data actually is. Similarly, all nine bits of data can be written in a single write operation. This reduces the number of I/O operations necessary in, for example, an interrupt service routine.

Figures 12A, 12B:
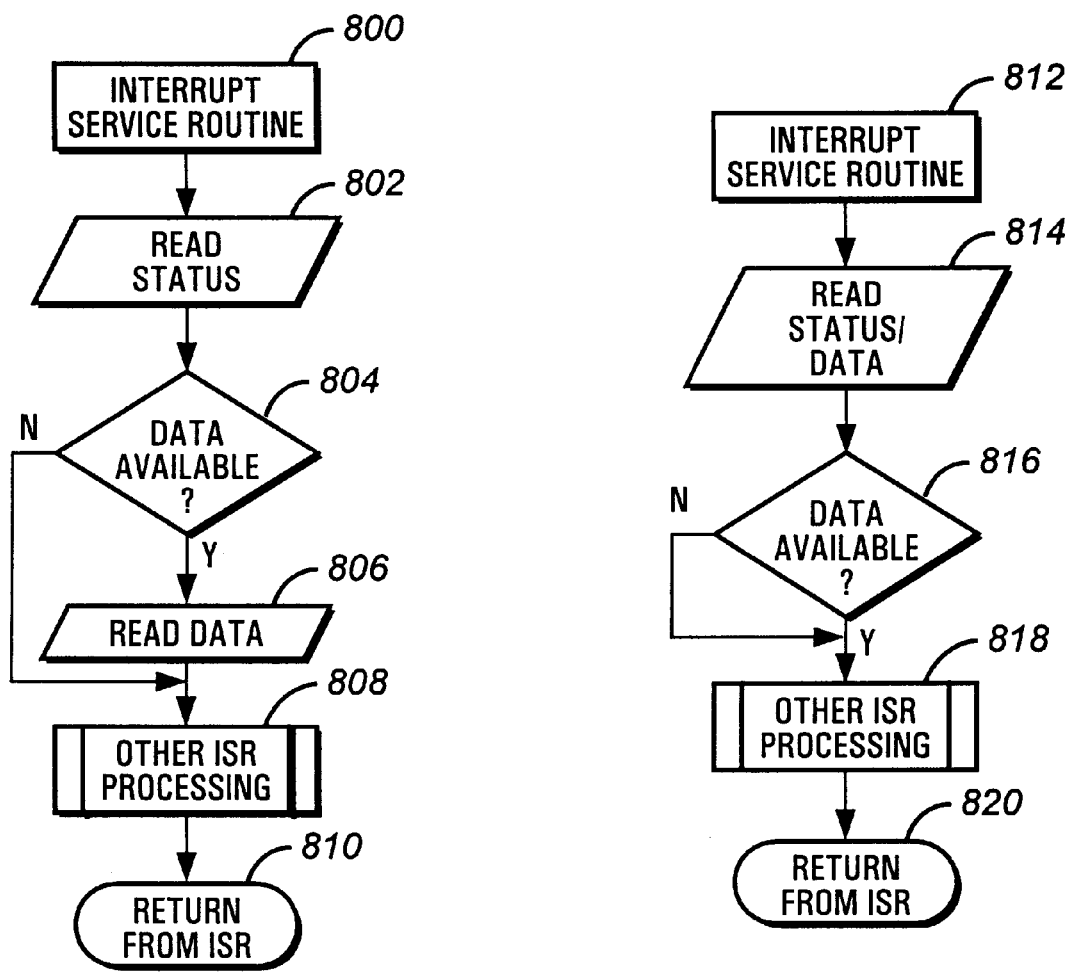
FIG. 12A and 12B are flowcharts illustrating interrupt service routines according to both the prior art and the invention.

This is illustrated in FIGS. 12A and 12B. FIG. 12A is a simplified flowchart showing basic flow in an interrupt service routine (ISR) 800 that would typically be executed in the prior art. In a first step 802, the execution unit 124 reads the status from the asynchronous serial port in the prior art. If, at step 804, it is determined that data is available from that port, control proceeds to step 806, where another read is executed, this time actually retrieving the data. From both steps 804 and 806, control then proceeds to step 808 for other ISR processing, and then on to step 810 for a return from the interrupt.

In comparison, FIG. 12B is a simplified flowchart of an ISR as it could be implemented according to the invention. An interrupt service routine 812 begins at step 814, where the extended receive register 54A is read, thus simultaneous retrieving both data and status. Proceeding to step 816, the ISR 812 then determines if data is available, but unlike in the prior art ISR 800, no additional read is necessary. The data, if available, has already been read at step 814. Control then proceeds to any other ISR processing at step 818, and then returns at step 820.

Thus, even when DMA is not used, the extended receive register according to the invention provides benefits.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An asynchronous serial port, comprising:
    an asynchronous serial receiver configurable for receiving a frame over a serial bus, the frame having at least 9 data bits; and
    a plurality of registers including a receive data register for storing the at least 9 data bits of the frame, wherein the receive data register further stores status bits indicating the status of the asynchronous serial receiver corresponding to the at least 9 data bits.

2. The asynchronous serial port of claim 1 further comprising:
    an asynchronous serial transmitter for transmitting a second frame over the serial bus, the second frame having at least 9 data bits; and the plurality of registers further including a transmit data register for holding the at least 9 data bits of the second frame.

3. The asynchronous serial port of claim 2, wherein the transmit data register is 16 bits wide.

4. The asynchronous serial port of claim 2, wherein the plurality of registers includes a control register with an extended write enable bit that when true enables the transmit data register to hold and transmit the at least 9 data bits, and when false restricts the transmit data register to hold 8 or less of the at least 9 data bits.

5. The asynchronous serial port of claim 1, further comprising a control register, the control register configurable to store none of the at least 9 data bits.

6. The asynchronous serial port of claim 1, wherein the receive data register is 16 bits wide.

7. The asynchronous serial port of claim 1, wherein the status bits include status for overrun, frame error, and parity error.

8. The asynchronous serial port of claim 7, wherein the plurality of registers includes a control register with an extended read enable bit that when true enables the receive data register to hold the at least 9 data bits and the status bits, and when false restricts the receive data register to hold 8 or less of the at least 9 data bits and no status bits.

9. An asynchronous serial port, comprising:
    an asynchronous serial receiver configurable for receiving a frame over a serial bus, the frame having a plurality of data bits; and
    a plurality of registers including a receive data register for storing both the plurality of data bits and status bits indicating the status of the asynchronous serial receiver corresponding to the received frame.

10. The asynchronous serial port of claim 9, wherein the status bits include status for overrun, frame error, and parity error.

11. The asynchronous serial port of claim 10, wherein the plurality of registers includes a control register with an extended read enable bit that when true enables the receive data register to hold the plurality of data bits and the status bits.

12. A microcontroller implemented as a single monolithic integrated circuit, comprising:
    an execution unit for executing instructions; and
    an asynchronous serial port comprising:
    an asynchronous serial receiver configurable for receiving a frame over a serial bus, the frame having a plurality of data bits; and
    a plurality of registers including a receive data register for holding the plurality of data bits and status bits indicating the status of the asynchronous serial receiver corresponding to the frame, the receive data register readable by a single read operation.

13. The microcontroller of claim 12, wherein the status bit includes status for overrun, frame error, and parity error.

14. The microcontroller of claim 13, further comprising:
    a direct memory access (DMA) unit for transferring data to or from memory, the DMA unit coupled to and programmable by the execution unit,
    wherein the DMA unit is configurable to read a plurality of data items corresponding to a plurality of received frames from the receive data register, each of the plurality of data items including a plurality of data bits and status bits reflecting the status of a corresponding received frame, and wherein the stored plurality of data items can include status bits indicating error in a corresponding received frame while indicating the associated data item to which the error applies.

15. The microcontroller of claim 12, further comprising:
    a direct memory access (DMA) unit for transferring data to or from memory, the DMA unit coupled to and programmable by the execution unit,
    wherein the DMA unit is configurable to read a plurality of data items corresponding to a plurality of received frames from the receive data register and store the plurality of data items in a memory, wherein the stored plurality of data items each include a plurality of data bits and status bits associated with the frame in which the plurality of data bits were received.

16. The microcontroller of claim 15, wherein the DMA unit is configurable to read the plurality of data items and store the data items in memory using word wide transfers.

17. A microcontroller implemented as a single monolithic integrated circuit, comprising:
    an execution unit for executing instructions; and
    an asynchronous serial port comprising:
    an asynchronous serial receiver configurable for receiving a frame over a serial bus, the frame having at least 9 data bits; and
    a plurality of registers including a receive data register for holding the at least 9 data bits and status bits indicating the status of the asynchronous serial receiver corresponding to the frame, the receive data register readable by a single read operation.

18. The microcontroller of claim 17, further comprising:
    a direct memory access (DMA) unit for transferring data to or from memory, the DMA unit coupled to and programmable by the execution unit,
    wherein the DMA unit is configurable to read a plurality of data items corresponding to a plurality of received frames from the receive data register and store the plurality of data items in a memory, wherein the stored plurality of data items each include a plurality of data bits and status bits associated with the frame on which the plurality of data bits were received.

19. The microcontroller of claim 18, wherein the DMA unit is configurable to read the plurality of data items and store the data items in memory using word wide transfers.

20. A method of receiving high speed asynchronous data in a microcontroller that includes a DMA unit, an asynchronous serial port, and an execution unit, the method comprising the steps of:
    receiving a frame of asynchronous serial data by the asynchronous serial port;
    determining status conditions indicating the status of the asynchronous serial port corresponding to the received frame;
    performing a DMA transfer by the DMA unit receiving a receive data register containing the data bits of the received frame and status bits corresponding to the status conditions from the asynchronous serial port; and
    storing the read data item in a memory.

21. The method of claim 20, wherein the steps of claim 21 are repeated for a plurality of data items.

22. The method of claim 21, further comprising the step of:

reading an asynchronous serial port status register after repeating the steps of claim 21 to determine if any of the received frames caused an error.

23. The method of claim 22, further comprising the step of:

if it is determined that any of the received frames caused an error, reading the data stored in memory to determine which received frames caused an error.

24. A microcontroller comprising:

means for receiving a frame of asynchronous serial data; means for determining status conditions indicating the status of the receiving means corresponding to the received frame; and means for transferring data bits and corresponding status bits reflecting the status condition from the means for receiving and the means for determining to a memory.

* * * * *